(12) United States Patent
Liao et al.

(10) Patent No.: US 7,035,331 B2
(45) Date of Patent: Apr. 25, 2006

(54) METHOD AND APPARATUS FOR PERFORMING A PIXEL AVERAGING INSTRUCTION

(75) Inventors: Yuyun Liao, Chandler, AZ (US); Nigel C. Paver, Austin, TX (US); James E. Quinlan, Marlboro, MA (US)

(73) Assignee: Intel Corporation, Santa Clara, CA (US)

( * ) Notice: Subject to any disclaimer, the term of this patent is extended or adjusted under 35 U.S.C. 154(b) by 725 days.

(21) Appl. No.: 10/081,926

(22) Filed: Feb. 20, 2002

(65) Prior Publication Data

US 2003/0158881 A1    Aug. 21, 2003

(51) Int. Cl.
*H04N 7/12*      (2006.01)
*H04N 11/02*    (2006.01)

(52) U.S. Cl. .................... 375/240.01; 375/240.21; 345/643

(58) Field of Classification Search ............. 375/240.1, 375/240.26; 345/606, 643; 382/264, 299
See application file for complete search history.

(56) References Cited

U.S. PATENT DOCUMENTS

| | | | | |
|---|---|---|---|---|
| 5,754,240 A | * | 5/1998 | Wilson | ................... 375/240.15 |
| 5,917,739 A | * | 6/1999 | Wong | .......................... 708/445 |
| 5,928,316 A | * | 7/1999 | Wong et al. | ................. 708/501 |
| 5,943,250 A | * | 8/1999 | Kim et al. | ................... 708/625 |
| 5,943,251 A | * | 8/1999 | Jiang et al. | ................. 708/710 |
| 6,058,465 A | * | 5/2000 | Nguyen | ........................ 712/7 |
| 6,078,941 A | * | 6/2000 | Jiang et al. | ................. 708/625 |
| 6,512,523 B1 | | 1/2003 | Gross | |
| 6,578,063 B1 | * | 6/2003 | Kojima et al. | .............. 708/708 |

FOREIGN PATENT DOCUMENTS

| | | |
|---|---|---|
| EP | 0 370 718 | 5/1990 |
| WO | WO 88/07722 | 10/1988 |

OTHER PUBLICATIONS

Smith, Roger, "Optimizing Video on Servers Using Intel® NetBurst™ Microarchitecture", *Intel Optimizing Center* [Online], http://www.portals.devx.com/Intel/Article/6681/2217?pf=true (2003).

"Using MMXtm Instructions to Implement Optimized Motion Compensation for MPEG1 Video Playback", *MMX Technology Application Noted* [Online], hrttp://www.cae.wisc.edu/~ece734/mmx/AP-529.html (2003).

* cited by examiner

*Primary Examiner*—Gims Philippe
*Assistant Examiner*—Erick Rekstad
(74) *Attorney, Agent, or Firm*—Rita M. Wisor

(57) ABSTRACT

In an embodiment, a functional unit including a compressor section and a 36-bit SIMD adder is used to perform a STMD four-pixel averaging instruction. The functional unit generates four four-pixel averages. Four pixel values and a rounding value are compressed into a sum and a carry vector. The two least significant bits of the sum vector and the LSB of the carry vector are dropped before being input to the 36-bit SIMD adder. The two resultant 8-bit vectors are added by the 36-bit adder to directly generate the average pixel value result.

23 Claims, 3 Drawing Sheets

METHOD AND APPARATUS FOR PERFORMING A PIXEL AVERAGING INSTRUCTION

BACKGROUND

Many image and video processing techniques include operations in which a number of pixel values are averaged. These pixel averaging operations may be used for, for example, filtering and image estimation. The averaging may be performed on the pixel values of a number of neighboring pixels. The averaging may also be performed on the pixel values corresponding to the same pixel at different times, e.g., between frames. These averaging operations may be computationally intensive.

In order to support the computational load and data throughput requirements associated with performing a large number of averaging operations, processors used for image and video processing may introduce SIMD (Single-Instruction/Multiple-Data) operations. In SIMD operations, a single instruction is sent to a number of processing elements, which perform the same operation on different data.

One type of SIMD operation utilized in some image processing algorithms is a four-pixel averaging operation. A SIMD arithmetic logic unit (ALU) used to produce the average values may perform four addition and averaging operations on four sets of pixel values simultaneously to produce four 8-bit pixel average values. A 40-bit SIMD adder may be used to perform this instruction on 8-bit values. The 40-bit SIMD adder includes two dummy bits for each byte. One dummy bit controls the blocking or propagation of carries from an addition operation, and the other dummy bit controls a shifting operation. The shifting operation may be performed only in the four-pixel averaging operation, while other instructions that utilize the SIMD adder may only require a 36-bit adder. A 40-bit SIMD adder may have a larger layout than a 36-bit SIMD adder and require additional structure to accommodate the extra dummy bits, taking up limited chip area just to accommodate one instruction.

DETAILED DESCRIPTION

Figure 1:
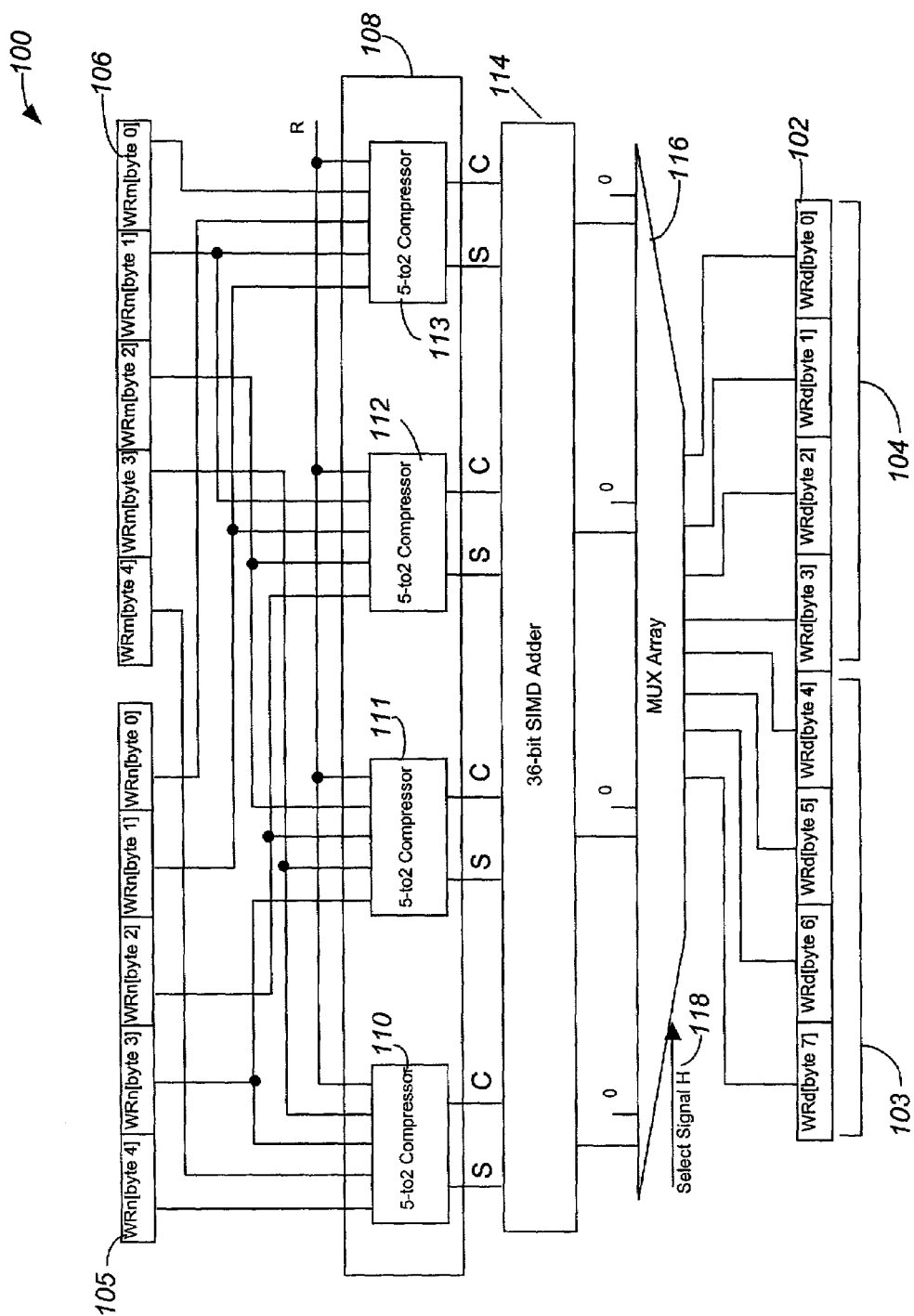
FIG. 1 is a block diagram of a functional unit for performing a four-pixel averaging SIMD (Single-Instruction/Multiple-Data) operation according to an embodiment.

FIG. 1 illustrates a functional unit 100 for performing a four-pixel averaging SIMD (Single-Instruction/Multiple-Data) instruction according to an embodiment. The functional unit 100 may be implemented in a processor, for example, a general purpose processor, a digital signal processor (DSP), or and application specific integrated circuit (ASIC) processor, for image and/or video processing.

The four-pixel average (FPA) SIMD instruction be performed on the pixel values of four neighboring pixels and/or the pixel values of the same pixel at different times, e.g., between frames. The FPA SIMD instruction may treat the pixel values (operands) as packed 8-bit (byte) values.

The FPA instruction may be implemented using the following format:

FPA <H,L> {R} wRd wRn wRm, where H, L, and R are qualifiers, wRm and wRn are packed operands, and wRd is a destination register 102. The qualifier H indicates that the results are to be placed in the high order bytes 103 of the destination register (wRd) 102, The qualifier L indicates that the results are to be placed in the low order bytes 104 of the destination register 102, and R is a rounding value, which may be set to a value of $2_{10}$ ($10_2$). The values of wRm and wRn and wRd may be treated as unsigned, packed 8-bit data and the results of the FPA SIMD instruction may be written in unsigned, packed 8-bit format.

The four-pixel averaging operation may be carried out as follows:

If (H Specified) then
    wRd[byte7]=(wRn[byte 4]+wRm[byte 4]+wRn[byte 3]+wRm[byte 3]+Round)>>2
    wRd[byte6]=(wRn[byte 3]+wRm[byte 3]+wRn[byte 2]+wRm[byte 2]+Round)>>2
    wRd[byte 5]=(wRn[byte 2]+wRm[byte 2]+wRn[byte 1]+wRm[byte 1]+Round)>>2
    wRd[byte 4]=(wRn[byte 1]+wRm[byte 1]+wRn[byte 0]+wRm[byte 0]+Round)>>2
    wRd[byte 3]=0
    wRd[byte 2]=0
    wRd[byte 1]=0
    wRd[byte 0]=0;
Else if (L Specified) then
    wRd[byte 7]=0
    wRd[byte 6]=0
    wRd[byte 5]=0
wRd[byte 4]=0
wRd[byte 3]=(wRn[byte 4]+wRm[byte 4]+wRn[byte 3]+wRm[byte 3]+Round)>>2
wRd[byte 2]=(wRn[byte 3]+wRm[byte 3]+wRn[byte 2]+wRm[byte 2]+Round)>>2
wRd[byte 1]=(wRn[byte 2]+wRm[byte 2]+wRn[byte 1]+wRm[byte 1]+Round)>>2
wRd[byte 0]=(wRn[byte 1]+wRm[byte 1]+wRn[byte 0]+wRm[byte 0]+Round)>>2 where ">>2" indicates that the result of the addition operation is shifted right by two bits.

A set of five operands, wRn[byte 0] to wRn[byte 4], are stored in a wRn register 105. Another set of five operands, wRm[byte 0] to wRm[byte 4], are stored in a wRm register 106. A compressor stage 108 includes four "5-to-2" compressors 110–113. Each compressor 110–113 compresses five vectors, i.e., four operands and the rounding value, into two vectors. For example, compressor 110 receives the vectors wRn[byte 4], wRm[byte 4], wRn[byte 3], wRm[byte 3], and the rounding value ($R=2_{10}$), and generates a sum vector (S) and a carry vector (C). The sum and carry vectors generated by compressor 110 may be passed to a 36-bit SIMD (Single-Instruction/Multiple-Data) adder 114 along with the sum and carry vectors generated by the other compressors 111–113.

Figure 2:
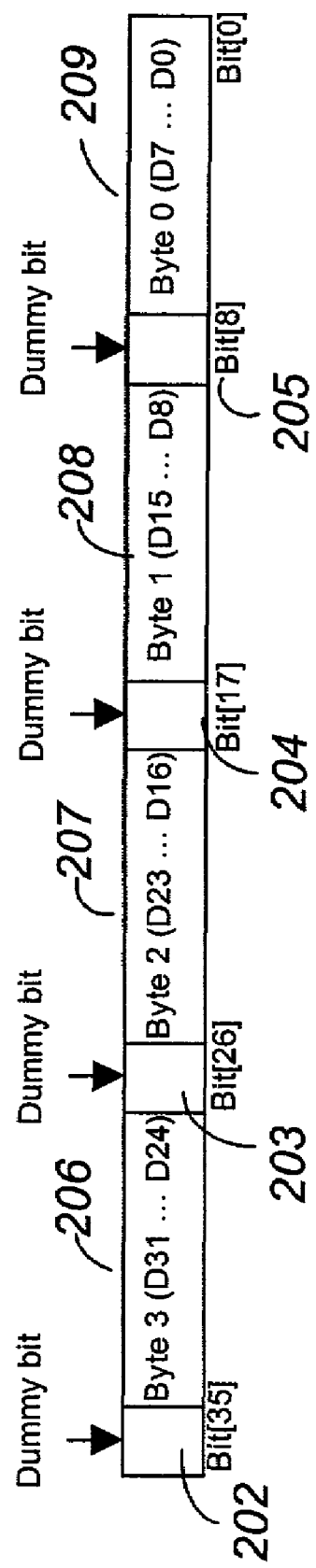
FIG. 2 is a block diagram illustrating the bit positions of a SIMD adder according to an embodiment.

The SIMD adder 114 operates on the various sum and carry vectors from the different compressor 110–113 separately to produce four 8-bit pixel average value results. The SIMD adder 114 may be 36-bits wide, including a dummy bit 202–205 for each of the four byte locations 206–209, as shown in FIG. 2. The dummy bits block or propagate the carries from the addition operation performed by the SIMD adder. The 36-bit SIMD adder may also be used by other instructions, and may operate on packed 8-bit, packed half word (16-bit), and packed word (32-bit) operands.

The results in the byte locations 206–209 output from the SIMD adder 114 are directed to the proper byte locations in the destination register 102 by a multiplexer 116 in response to a select signal 118. If H is selected, the four pixel average values are placed in high order byte positions 103 (wRd[byte 4] . . . wRd[byte 7]). Otherwise, the four pixel average values are placed in low order byte positions 104 (wRd[byte 0] . . . wRd[byte 3]).

As described above, the FPA instruction adds four pixel values wRm[byte i]+wRn[byte i]+wRm[byte (i−1)+wRn [byte (i−1)] for i=1→4, and then produces an average value by dividing the sum by four. In binary division, dividing a number by four may be accomplished by adding a round value of $2_{10}$ ($01_2$) and shifting the result right by two bit positions. The two least significant bits (LSBs) of the result are discarded.

Figure 3:
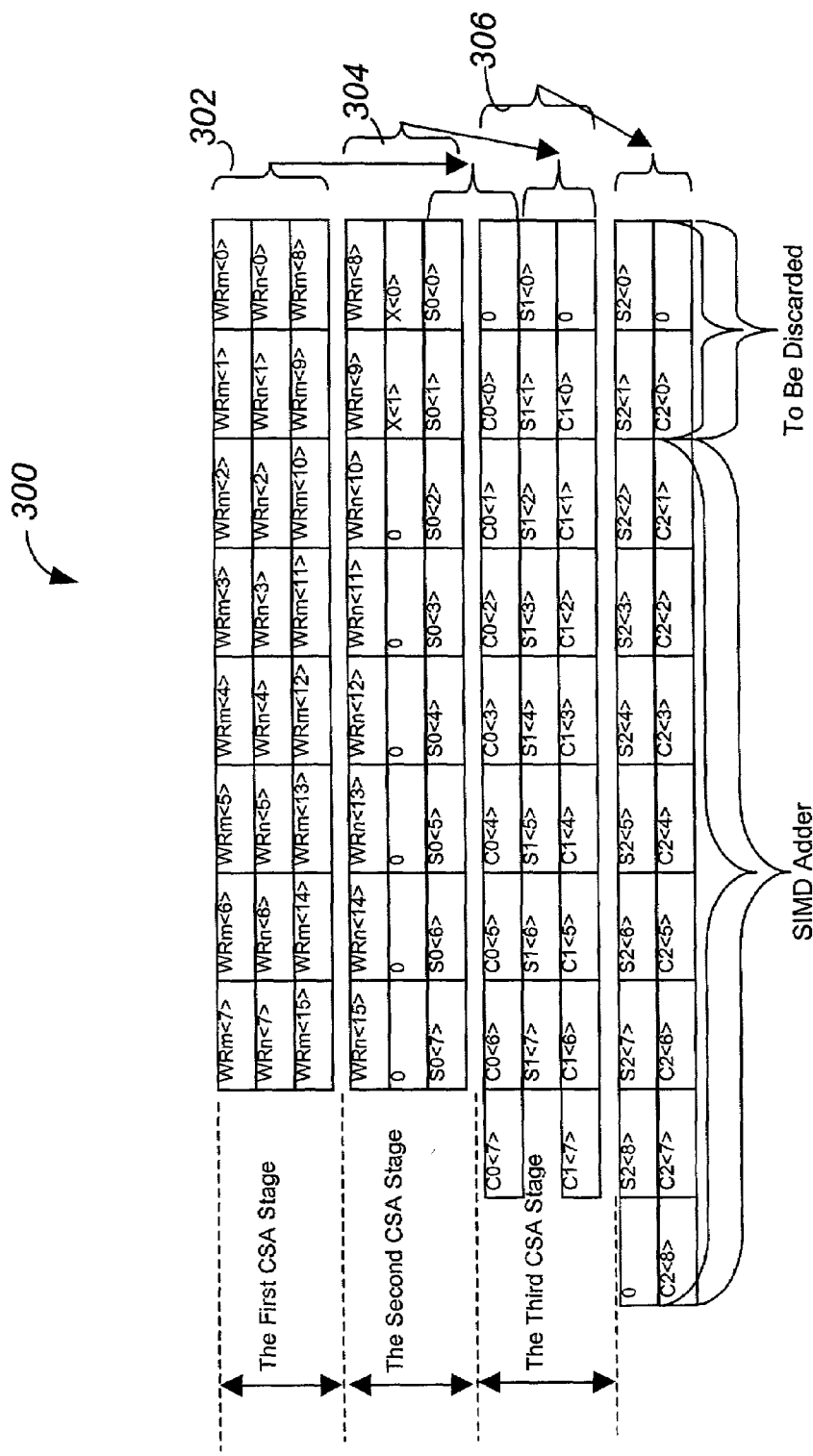
FIG. 3 is a block diagram illustrating the operational flow of a four-pixel averaging operation according to an embodiment.

Typically, the compressors pass sum and carry vectors to a SIMD ALU which performs both an addition operation and a shifting operation. FIG. 3 illustrates an operational flow performed by the 5-to-2 compressors 110–113 to produce a sum vector (S) and a carry vector (C) which can be added by the SIMD adder 114 to produce an pixel average value result directly, i.e., without the shifting operation.

Each 5-to-2 compressor 110–113 may include three stages of "3-to-2" compressors, a first carry shift adder (CSA) stage 302, a second CSA stage 304, and a third CSA stage 306. The 3-to-2 compressors each compress three vectors into a sum vector and a carry vector. The different 5-to-2 compressors 110–113 operate similarly, but on different pixel values. Consider the 5-to-2 compressor 110, which compresses the operands wRm[byte 4], wRn[byte 4], wRm[byte 3], wRn[byte 3], and the rounding vector R. In this case, WRm<0> . . . <7> correspond to the bits of wRm[byte 3], WRn<0> . . . <7> correspond to the bits of wRn[byte 3], WRm<8> . . . <15> correspond to the bits of wRm[byte 4], and WRn<8> . . . <15> correspond to the bits of wRn[byte 4]. In the first CSA stage 302, wRm[byte 3], wRn[byte 3], and wRm[byte 4] are compressed into a sum vector S0 having bits S0<0> . . . S<7> and a carry vector C0 having bits C0<0> . . . C0<7>. In the second stage, wRn[byte 4], S0, and a Round vector of $2_{10}$ (x<1>x<0>=$10_2$) are compressed into a sum vector S1 having bits S1<0> . . . S1<7> and a carry vector C1 having bits C1<0> . . . C1<7>. In the third stage, vectors C0, S1, and C1 are compressed into a sum vector S2 having bits S2<0> . . . S2<7> and a carry vector having bits C2<0> . . . C2<7>.

As described above, the least two LSBs of the result of (wRn[byte 4]+wRm[byte 4]+wRn[byte 3]+wRm[byte 3]+Round) are discarded in the shifting operation (>>2). The only useful data from the two LSBs is the carry out C2<0>. Since the LSBs of the three input vectors C0, S1, and C1 in the third stage 304 of the operation 300 are 0, S1<0>, and 0, respectively, the carry out, C2<0>, equals 0.

In conventional implementations, 10-bit values {0 S2<8> . . . S<0>} and {C2<8> C2<7> . . . C2<0> 0} are fed into a 10-bit adder in a 40-bit SIMD ALU, and then the result is shifted right by 2-bits. Since the carry out C2<0> from last two bits is 0 and last 2 bits of the results from the adder are discarded anyway, only 8-bit values {0 S2<8> . . . S<3> S<2>} and {C2<8> C2<7> . . . C2<2> C2<1>} are needed. These 8-bit values may be added by an 8-bit adder in the 36-bit SIMD adder 114. The result from the addition operation performed by the adder 114 does not need to be shifted right by 2 bits. Thus, the 36-bit SIMD adder generates the four-pixel average values of the FPA instruction direct in one (addition) operation, and the adder does not need to perform the shifting operation.

The 40-bit SIMD ALUs that may be used to perform the FPA instruction include two dummy bits for each byte, one block or propagate carries, and the other to control the shifting operation. However, in general, other instructions do not require the shifting operation, and may be performed on the 36-bit SIMD adder 114, which includes only one dummy bit 202–205 per byte 206–209.

The 36-bit SIMD adder 114 may be desirable from a design and performance perspective over a comparable 40-bit SIMD ALU for several reasons. The 36-bit SIMD adder may have a shorter critical path delay and a layout which is >10% smaller than that of a comparable 40-bit SIMD ALU. Furthermore, in order to align with the 40-bit SIMD adder layout, all other functional units in the data path may have to accommodate one more dummy data bit for every byte. Consequently, the whole data path may have to be increased by >10% just to accommodate the FPA SIMD instruction.

Although packed 8-bit operands and results have been described, the functional unit 100 and FPA SIMD instruction may operate on other data sizes (e.g., 16-bit and 32-bit operands) by selecting component functional units and data paths layouts that accommodate the different data size. Also, SIMD instructions that operate on data multiples other than four, as described above in connection with the 36-bit adder, may also be implemented by selecting component functional units and data path layouts that accommodate the different data multiples.

A number of embodiments have been described. Nevertheless, it will be understood that various modifications may be made without departing from the spirit and scope of the invention. Accordingly, other embodiments are within the scope of the following claims.

The invention claimed is:

1. A method comprising:
    compressing a plurality of pixel values and a rounding vector into a first sum vector and a first carry vector;
    discarding a least significant bit of the first carry vector;
    discarding a two least significant bits of the first sum vector; and
    adding the first sum vector and the first carry vector to generate a pixel average value.

2. The method of claim 1, wherein said adding the first sum vector and the first carry vector is performed with a Single-Instruction/Multiple-Data (SIMD) adder.

3. The method of claim 1, wherein said compressing a plurality of pixel values and a rounding vector comprises compressing four pixel values and a rounding vector.

4. The method of claim 3, wherein the pixel values comprise 8-bit values.

5. The method of claim 4, wherein the SIMD adder comprises a 36-bit adder including one dummy bit for each of four byte locations.

6. The method of claim 1, wherein the rounding vector is $10_2$.

7. The method of claim 3, wherein said compressing four pixel values and a rounding vector is performed in three stages.

8. The method of claim 7, wherein said three stages comprise:
    compressing three of said four pixel values into a second sum vector and a second carry vector;

compressing the fourth pixel value, the rounding vector, and the second sum vector into a third sum vector and a third carry vector; and compressing the second carry vector, third sum vector and third carry vectors into said first sum and first carry vectors.

9. Apparatus comprising:

a compressor stage including a plurality of compressors, each compressor operative to compress a plurality of operands and a rounding vector into a first sum vector and a first carry vector and to discard a two least significant bits (LSBs) of said first sum vector and an LSB of the first carry vector; and a Single-Instruction/Multiple-Data (SIMD) adder operative to add the first sum vector and the first carry vector to generate an average pixel value.

10. The apparatus of claim 9, wherein said plurality of compressors comprises four compressors.

11. The apparatus of claim 9, wherein each compressor is operative to compress four operands and a rounding vector.

12. The apparatus of claim 9, wherein said pixel values and the average pixel value comprise 8-bit values.

13. The apparatus of claim 12, wherein the SIMD adder includes one dummy bit per byte location.

14. The apparatus of claim 9, wherein the rounding vector is $10_2$.

15. The apparatus of claim 11, wherein each compressor comprises:

a first compressor operative to compress three of said four pixel values into a second sum vector and a second carry vector;

a second compressor operative to compress the fourth pixel value, the rounding vector, and the second sum vector into a third sum vector and a third carry vector; and a third compressor operative to compress the second carry vector, third sum vector and third carry vectors into said first sum and first carry vectors.

16. An article comprising a machine-readable medium include machine readable instructions, the instructions operative to cause a machine to:

compress a plurality of pixel values and a rounding vector into a first sum vector and a first carry vector;

discard a least significant bit of the first carry vector;

discard a two least significant bits of the first sum vector; and add the first sum vector and the first carry vector to generate a pixel average value.

17. The article of claim 16, adding the first sum vector and the first carry vector is performed with a Single-Instruction/Multiple-Data (SIMD) adder.

18. The article of claim 16, wherein the instructions for compressing a plurality of pixel values and a rounding vector comprise instructions operative to cause the machine to compress four pixel values and a rounding vector.

19. The article of claim 18, wherein the pixel values comprise 8-bit values.

20. The article of claim 19, wherein the SIMD adder comprises a 36-bit adder including one dummy bit for each of four byte locations.

21. The article of claim 16, wherein the rounding vector is $10_2$.

22. The article of claim 18, wherein the instructions causing the machine to compress four pixel values and a rounding vector comprise instructions causing the machine to compress the vectors in three stages.

23. The article of claim 22, wherein instructions causing the machine to compress the vectors in three stages comprising instructions causing the machine to:

compress three of said four pixel values into a second sum vector and a second carry vector;

compress the fourth pixel value, the rounding vector, and the second sum vector into a third sum vector and a third carry vector; and compress the second carry vector, third sum vector and third carry vectors into said first sum and first carry vectors.

* * * * *

UNITED STATES PATENT AND TRADEMARK OFFICE
CERTIFICATE OF CORRECTION

| | |
|---|---|
| PATENT NO. | : 7,035,331 B2 |
| APPLICATION NO. | : 10/081926 |
| DATED | : April 25, 2006 |
| INVENTOR(S) | : Liao et al. |

It is certified that error appears in the above-identified patent and that said Letters Patent is hereby corrected as shown below:

Title Page,
Item (57) Abstract: at line 2, delete "STMD" and insert --SIMD--.

Signed and Sealed this

Twenty-seventh Day of January, 2009

JOHN DOLL
*Acting Director of the United States Patent and Trademark Office*